United States Patent
Gardner et al.

(10) Patent No.: US 6,270,732 B1
(45) Date of Patent: *Aug. 7, 2001

(54) PARTICLE COLLECTION APPARATUS AND ASSOCIATED METHODS

(75) Inventors: James T. Gardner, Cupertino; Samuel R. Phillips, Portola Valley; Xiangxin Bi, San Ramon, all of CA (US)

(73) Assignee: NanoGram Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,729

(22) Filed: Jun. 30, 1998

(51) Int. Cl.⁷ ............................... B22F 9/14; B01J 19/08; B01J 19/12

(52) U.S. Cl. ................ 422/186.04; 422/171; 422/186; 55/300; 55/304

(58) Field of Search ..................... 422/168–171, 422/186, 186.04; 55/283, 299, 300, 304, DIG. 10

(56) References Cited

U.S. PATENT DOCUMENTS

| | | | |
|---|---|---|---|
| 3,951,627 | 4/1976 | Barr, Jr. et al. | 55/478 |
| 4,383,840 | * 5/1983 | Jones | 55/304 |
| 4,610,704 | 9/1986 | Richard | 55/302 |
| 4,666,472 | 5/1987 | Klimczak et al. | 95/280 |
| 4,789,387 | 12/1988 | Nemesi et al. | 95/280 |
| 4,842,832 | 6/1989 | Inoue et al. | 423/211 |
| 4,881,722 | 11/1989 | Koizumi et al. | 266/176 |
| 5,421,845 | 6/1995 | Gregg et al. | 55/294 |
| 5,460,701 | * 10/1995 | Parker et al. | 204/164 |
| 5,571,299 | 11/1996 | Tonn | 55/302 |
| 5,584,913 | 12/1996 | Williams | 55/287 |
| 5,616,171 | 4/1997 | Barris et al. | 95/280 |
| 5,683,477 | 11/1997 | Jung | 55/350.1 |
| 5,874,684 | 2/1999 | Parker et al. | 75/228 |
| 5,958,348 | * 9/1999 | Bi et al. | 422/186 |

OTHER PUBLICATIONS

Thiel Air Technologies Product Literature, Entitled "Dust Stop' ER".
Goyen Valve Corp. Product Literature, Entitled "Goyen Sequential Timer".
Thiel Air Technologies Product Literature, Entitled "Dust Stop' ER Pulsejet Baghouses".
Thiel Air Technologies Product Literature, Entitled "Clean Air Solutions".
"Hosokawa Mikropul Environmental Systems Product Literature", Oct. 1995.

* cited by examiner

Primary Examiner—Hien Tran
(74) Attorney, Agent, or Firm—Peter S. Dardi; Westman, Champlin & Kelly

(57) ABSTRACT

A particle collection apparatus has a chamber, one or more filters and a back pressure system. The filters are located in the flow path through the system to collect the particles from an input gas stream. The back pressure system applies a pulse of gas against the flow through the system to dislodge particles collected on the filters. The dislodged particles fall to a particle drain where they are removed from the system. The particle collection apparatus can be connected to a particle synthesis apparatus. The particle collection apparatus and the particle synthesis apparatus can operated at reduced pressures.

17 Claims, 4 Drawing Sheets

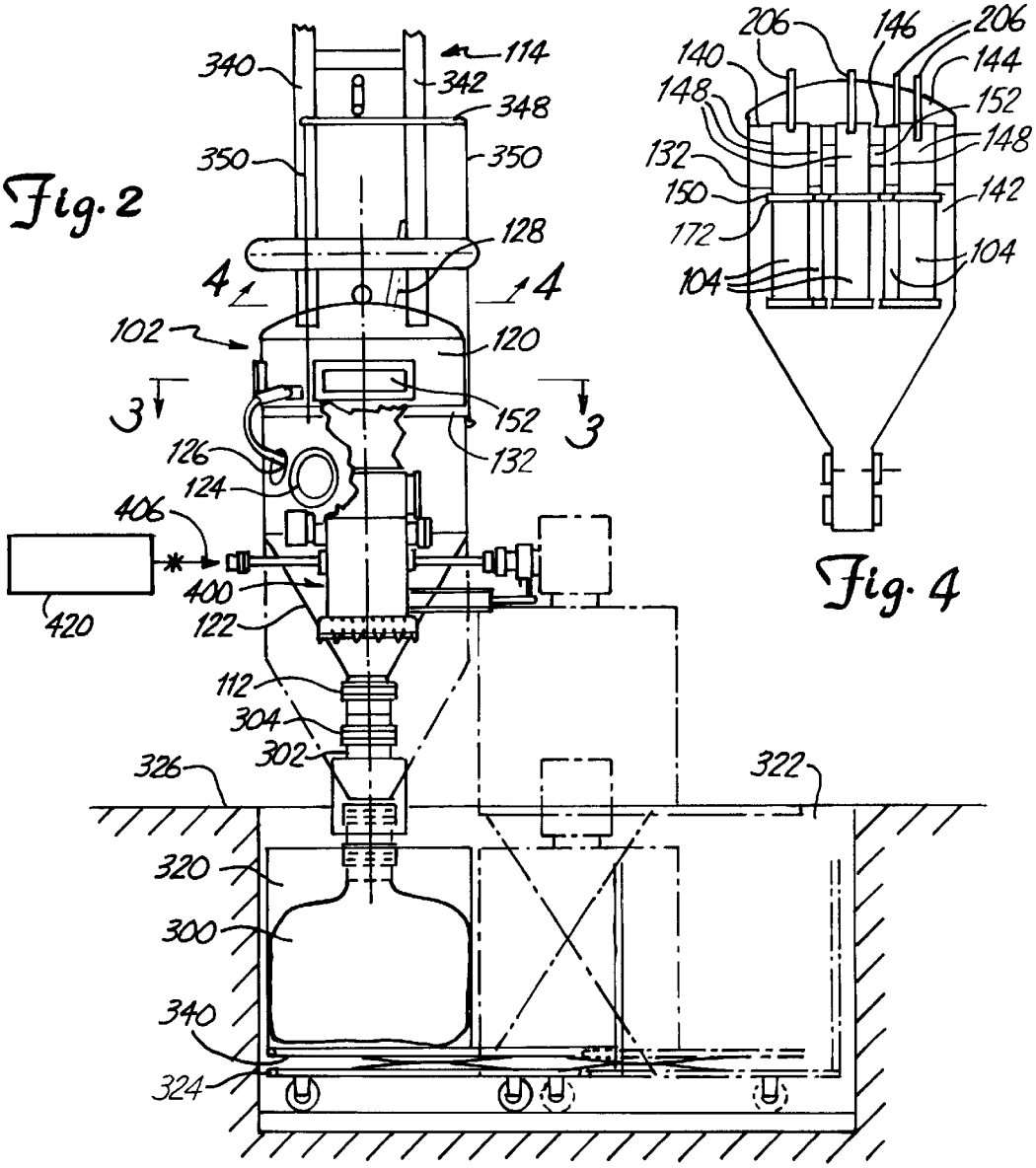
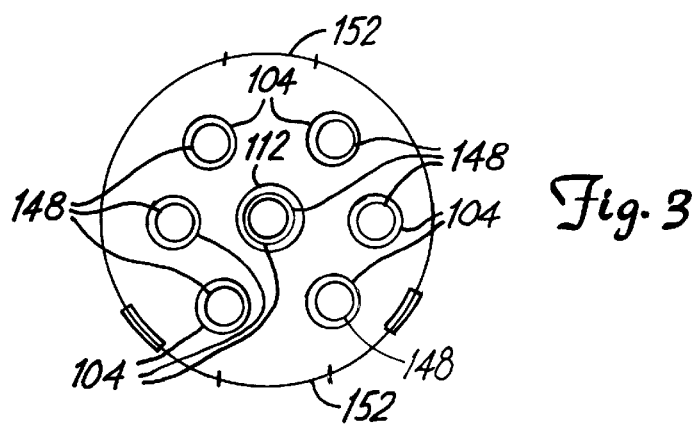

PARTICLE COLLECTION APPARATUS AND ASSOCIATED METHODS

FIELD OF THE INVENTION

The invention relates to an apparatus for collecting particles from a gas stream. In particular, the invention relates to an apparatus and associated method for the continuous collection and removal of particles from a gaseous flow. The apparatus can be used advantageously with a particle synthesis apparatus.

BACKGROUND OF THE INVENTION

Advances in a variety of fields have created a demand for a many types of new materials. In particular, a variety of chemical powders can be used in many different processing contexts. This demand for chemical powders has resulted in the development of sophisticated techniques for the production of these powders. Some of these techniques involve flow reactions that result in the formation of the powders in a gaseous stream. To commercially exploit these particle production processes on a practical scale, the processes must be capable of efficiently producing large quantities of particles in a reasonable period of time. These large quantities of particles must be harvested from the gaseous stream in which they are produced.

One approach for the removal of particles from a gaseous stream has been developed to remove dust and other contaminants for air purification. Generally, the particulate levels for air purification are very low. The materials removed from the dirty air are waste materials for disposal. These systems are designed for continuous operation for significant periods of time.

SUMMARY OF THE INVENTION

In one aspect, the invention features a particle production system including a particle synthesis apparatus and a particle collection apparatus. The particle synthesis apparatus includes a reaction chamber isolated from the ambient atmosphere, the reaction chamber having a reactant inlet for supplying reactant into the reaction chamber and a product outlet from which the product particles exit the reaction chamber. The particle collection apparatus includes a chamber, a filter and a particle removal system. The chamber has an inlet, a gas outlet, a particle drain and a constrained flow region separating the gas outlet from the inlet and from the particle drain. The filter is connected to the constrained flow region within the chamber such that the filter obstructs flow paths from the inlet to the gas outlet and such that particles dislodged from the filter flow to the particle drain. The particle removal applies forces to the filter to dislodge particles from the filter. The outlet of the particle synthesis apparatus is in fluid communication with the inlet of the particle collection apparatus.

In another aspect, the invention features a particle collection apparatus including a chamber, a filter and a particle removal system. The chamber has an inlet, a gas outlet, a particle drain and a constrained flow region separating the gas outlet from the inlet and from the particle drain. The chamber operates at a pressure less than about 700 Torr. The filter is connected to the constrained flow region within the chamber such that material within the filter obstructs flow paths from the inlet to the gas outlet and such that particles dislodged from the filter flow to the particle drain. The particle removal system applies forces to the filter to dislodge particles from the filter.

In a third aspect, the invention features a method of collecting particles from a gas stream using a collection chamber. The collection chamber includes a chamber, a filter within the chamber and a back pressure system. The back pressure system applies a gas pulse to the filter to dislodge particles from the filter. The method includes establishing a pressure within the chamber at a value less than about 700 Torr;

flowing a gas stream with particles into the chamber such that the pressure within the chamber is maintained less than about 700 Torr; and collecting particles removed from the gas stream.

BRIEF DESCRIPTION OF THE DRAWINGS

FIG. 2 is a side view of the particle collection apparatus of FIG. 1. Different positions of a cart and a second position of the collection chamber are shown in phantom lines.

FIG. 3 is a sectional view of the particle collection apparatus of FIG. 2 taken along line 3—3.

FIG. 4 is a sectional view of the particle collection apparatus of FIG. 2 taken along line 4—4.

DETAILED DESCRIPTION OF THE PREFERRED EMBODIMENTS

Figure 1:
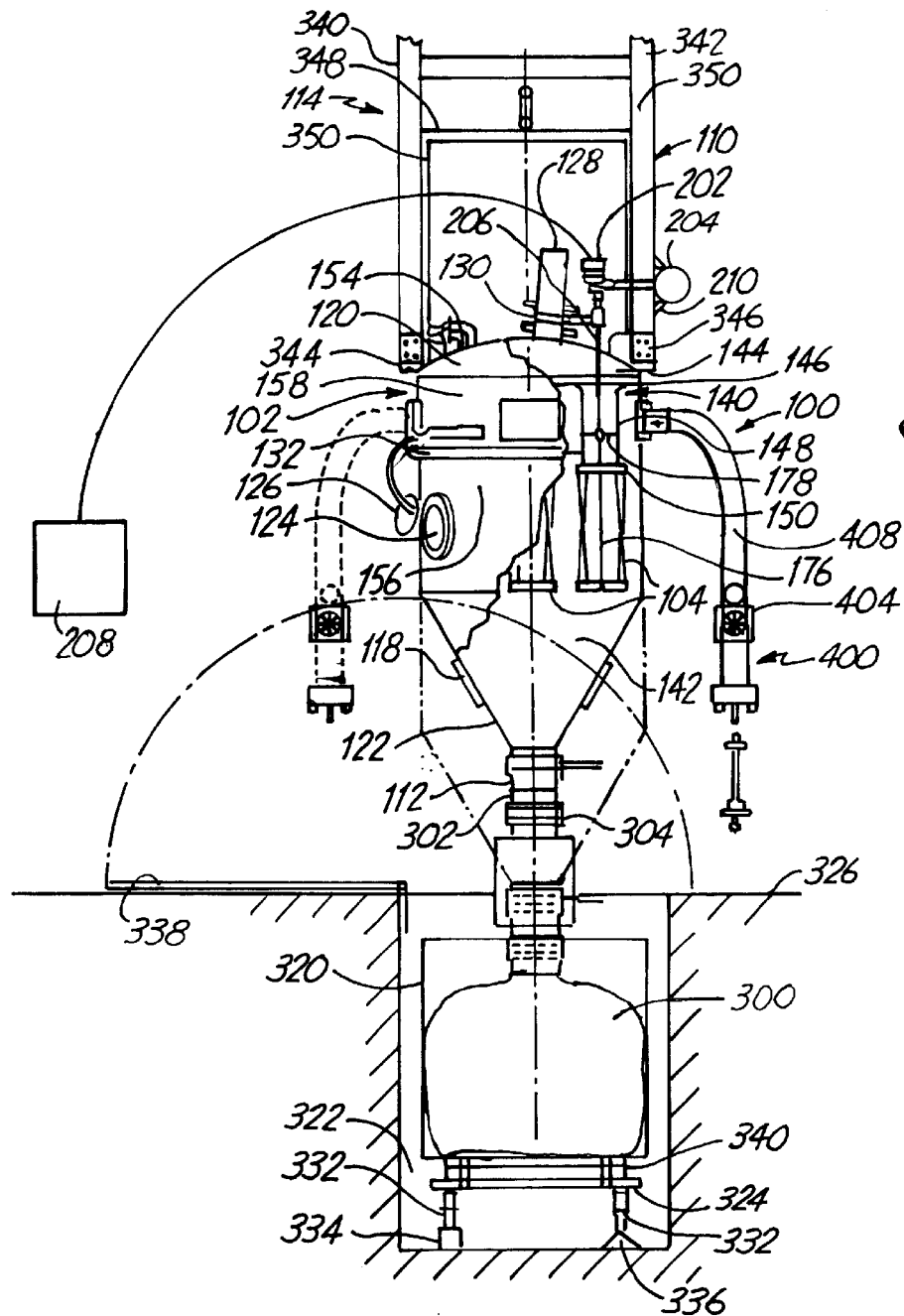
FIG. 1 is a front view of an embodiment of a particle collection apparatus connected to a laser pyrolysis apparatus, where a portion of the structure is removed to reveal hidden structure. An optional second laser pyrolysis apparatus and a second position of the collection chamber are shown in phantom lines.

An improved particle production system includes a particle collection apparatus that provides for continuous, high volume operation. The entire system generally operates under reduced pressure required for the particle production process. The pressure in the particle synthesis apparatus can be less than the pressure in the particle collection apparatus. The particle collection apparatus can remove particles from a gas stream having a high particle density under continuous operating conditions. The input stream into the collection system can have a density of particles greater than about 1 percent by weight or more preferably greater than about 5 percent by weight. This is a significantly higher density of solids than would be encountered in a ventilation system leading to an air purification system.

Generally, the output of the particle production apparatus feeds directly into the input of the particle collection apparatus. Continuous production is an significant feature for the commercial scale collection of particles from a particle synthesis apparatus. In particular, continuously produced nanoparticles, having an average diameter less than about 1 micron, can be collected with the particle collection apparatus.

Within a chamber of the particle collection apparatus, one or more filters interrupt the flow path of a gas stream containing the particles to be collected. The filters act as phase discriminators by passing gas-phase effluent but trapping most of the non-vapor phase material. At selected time intervals, forces are applied to the filter to dislodge the particles associated with the filter. In preferred embodiments, a back pressure pulse is applied to the filter to dislodge the particles. This embodiment is described further below. Alternatively, mechanical shaking can be applied to the filters to dislodge the particles.

The dislodged particles fall by way of gravity, with some initial assistance from flow currents with certain chamber designs, to a particle outlet where the particles are collected. The particles can be collected in a container, or the particles can be conveyed to a location for additional processing.

The one or more filters preferably include several filters of appropriate size. When two or more filters are used, back pressure is applied preferably to a subset of the filters, and more preferably to a single filter, at any particular time such that the flow into the particle collection apparatus at the inlet is not disturbed to a significant degree. A reduction of the perturbation on the input stream into the collection chamber may be a significant consideration when used with a particle synthesis apparatus. Appropriate selection of the number and size of the filters along with proper integration with the back pressure system provides for the removal of particles from a significant gas flow at even very high particle densities in the gas flow.

For use with a collection container, the particle output preferably includes a valve, which can be closed to facilitate exchange of the collection container without compromising the reduced pressure in the particle collection apparatus. Thus, the collection container can be replaced during continuous operation by closing the valve and substituting an empty container. Preferred collection containers include plastic bags. If a plastic bag is used, a sealing device can be used to seal the bag to contain the particles for transport. Another bag is used to replace the sealed bag. If a plastic bag is used, it must be placed while collecting particles within an exoskeleton that maintains its shape when evacuated to a pressure comparable to or less than the pressure within the collection system.

Alternatively, the particle output can direct the collected particles to a conveyor system. The conveyor system can move the particles to a conveniently located container or to a processing apparatus. If the processing apparatus operates at a different pressure than the particle collection apparatus, the conveyor system must include an air lock to provide for switching between the two different pressures.

Particle synthesis apparatuses using fluid flows and/or entrainment may operate under reduced pressure conditions. The chamber of the collection system then is at a similar reduced pressure. The reduced pressure for the collection apparatus and the particle synthesis apparatus can be generated by the attachment of a pump to the particle collection apparatus output. Preferred particle synthesis apparatuses involve the laser pyrolysis of chemical reactants to produce small particles under nonequilibrium conditions.

In summary, a particle production system includes a particle collection apparatus, a particle synthesis apparatus, a storage/conveyor system and an optional pump or other suction device. The components operate in a concerted fashion such that they can operate continuously for a considerable period of time. A specific embodiment is described next.

A. Particle Collection Apparatus

In a particular embodiment, the particle collection apparatus 100 features a chamber 102, filters 104, back pressure system 110, particle drain valve 112 and system positioning system 114, as depicted in FIGS. 1–2. Particle collection apparatus 100 connects to a storage/conveyor system at particle drain valve 112 and to a particle synthesis apparatus, as described further below.

Chamber 102 includes a tank 120 that generally is sealed off from the ambient environment. Tank 120 is accessible through various ports as described below. Tank 120 preferably has a funnel section 122 with sloping walls angled above the angle of repose that lead to particle drain valve 112. Funnel section 122 can include an sonic or mechanical shaker 118 to facilitate the movement of the particles to particle drain valve 112. Tank 120 can be made from any material or materials that are inert with respect to the fluids and particles flowing through the tank and that can withstand reduced pressure inside the tank. Preferred materials for tank 120 include, for example, stainless steel. The inside surface of tank 120 can include surface finishes to improve smoothness, corrosion resistance and/or electrical conductivity to inhibit particles sticking due to electrostatic forces. Suitable finishes include, for example, electropolish, bright anneal, non-stick polymers, conductive polymers, aluminum and other metals.

Tank 120 can include windows 124 made of transparent material sealed to the wall of tank 120 such that reduced pressure can be maintained within tank 120. Lamps 126 can be positioned near windows 124 to illuminate the inside of tank 120 for viewing. In the embodiment shown in FIG. 3, tank 120 includes two windows 124 to provide two views into tank 120. Different numbers and/or locations of windows and lamps can be used, as desired.

The top of tank 120 preferably has a head pressure tap 128 with a rupture disc 130. If the pressure in tank 120 becomes too high, rupture disc 130 breaks to prevent damage to tank 120 or to other components of the collection apparatus 100. In particular, rupture disc 130 is intended to prevent damage from a leak due to failure of a diaphragm valve resulting in a direct pressure leak from the gas pulse system or from deflagration if the particles within the tank undergo unexpected reaction, for example, due to reactivity with air leaking into the tank.

Figure 5:
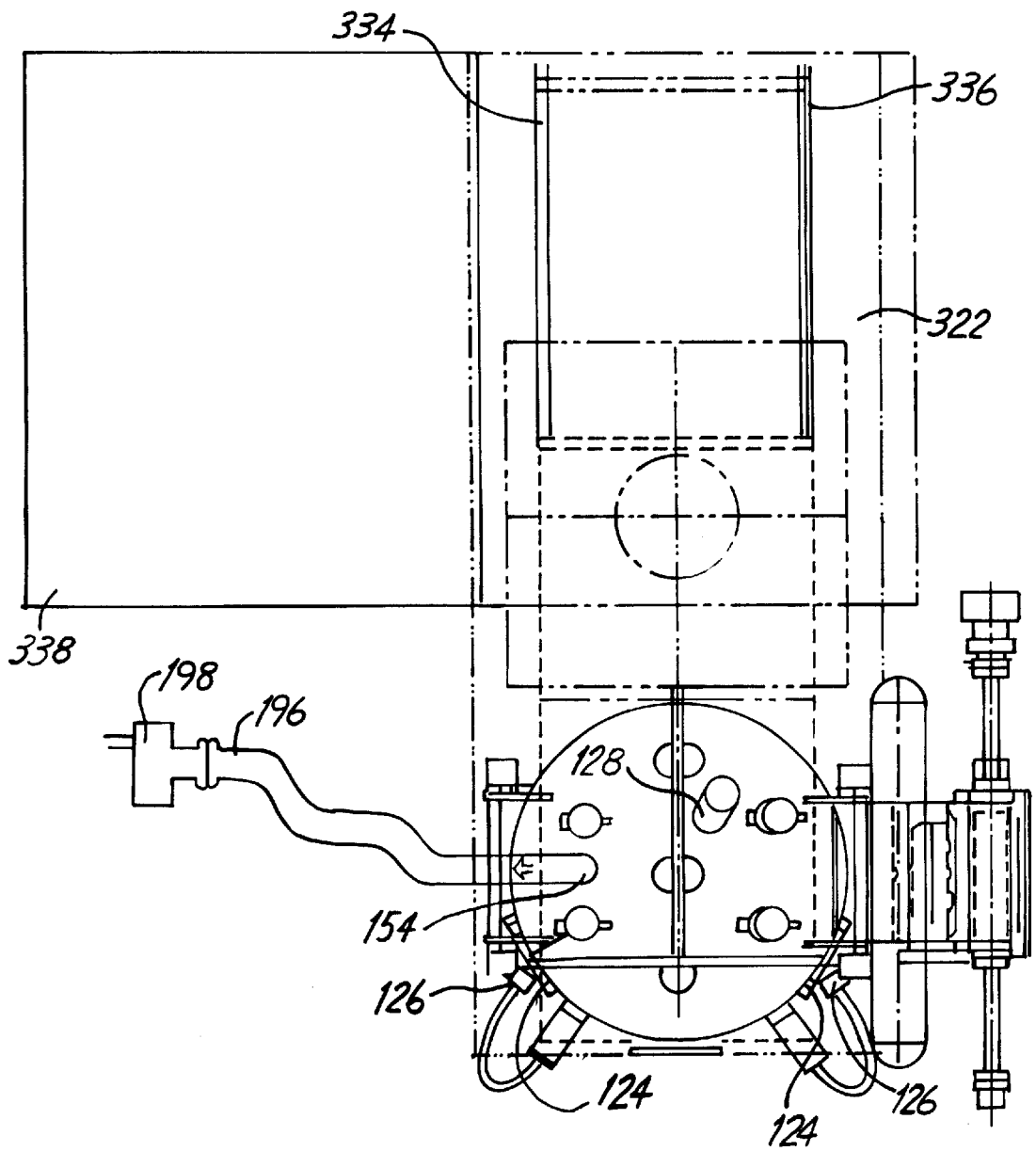
FIG. 5 is a top view of the particle collection apparatus of FIG. 1.

Tank 120 can be constructed in two sections connected with a connector 132. Connector 132 can be a flange secured with a bolt circle or a clamp of a variety of designs. The seal between the section of tank 120 at fastener 130 can include a gasket to help exclude the ambient air from entering tank 120. By disconnecting connector 132, the interior of tank 120 can be exposed for maintenance purposes, e.g., for replacement of filters 104 when they are no longer performing adequately and for the cleaning of the interior such as prior to collection of a different type of particle. As an alternative to constructing tank 120 with sections, tank 120 can include one or more doors to provide access to the interior of tank 120. Tank 120 further includes at least one inlet opening 152 (FIG. 2) and an exhaust opening 154 (FIG. 5).

Chamber 102 includes a constrained flow region formed by a tube sheet 140 or the like that divides the interior of tank 120 into a collection section 142 and a filtered plenum 144. The constrained flow region separates the clean space (filtered plenum 144) from the particle filled space (collection section 142). In the embodiment shown in FIGS. 1 and 4, tube sheet 140 includes a generally planar piece 146 and cylindrical portions or trunks 148. Cylindrical portions 148 include a lip 150 at which filters 104 are attached. Tube sheet 140 can be made from the same material as tank 120 or from one or more different materials with comparable mechanical properties. Chamber 102 preferably includes a pressure gauge 156 for collection section 142 and a pressure gauge 158 for filtered plenum 144. A single pressure gauge can be used in place of pressure gauges 156, 158 to measure the pressure difference between collection section 142 and filtered plenum 144.

Figure 6:
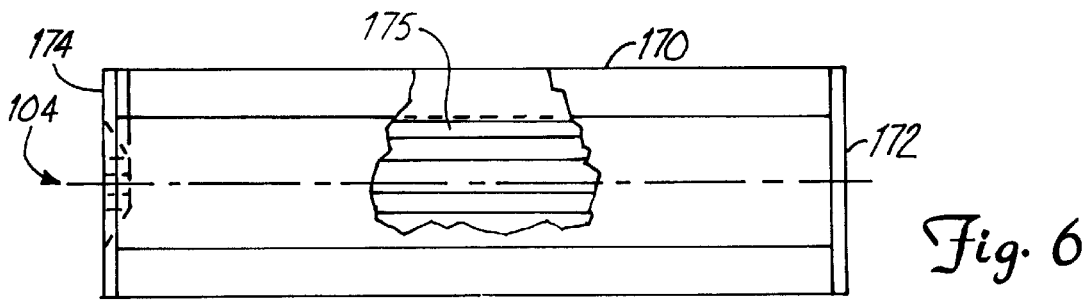
FIG. 6 is a sectional, side view of a filter from the particle collection apparatus of FIG. 1, where a portion of the outer surface of pleated filtering material is included to show the pleated filter material on the exposed surface of the filter and where a phantom line indicates the path of a stud used to secure the filter.

Referring to FIG. 6, filters 104 generally include a cylindrical section 170, an upper end cap 172 and a lower end cap 174. In the sectional view of FIG. 6, the lines extending the length of the filter indicate the inner boundary of the filter material. A portion of the pleated filter material in the surface of the filter is shown. Many variation on filter design can be used. In the embodiment shown in FIG. 6, the cylindrical section 170 includes pleated filter medium. Filter medium 175 also can be made from a variety of materials. Preferred filter media for inclusion in the cylindrical section 170 of filter 104 include sheets of polymer material that allow air flow but block the flow of nanoscale particles or other size particles. In one embodiment, filter medium 175 comprises a Tetratec® polytetrafluoroethylene (PTFE) membrane, sold by Tetratec Corp., Feasterville, Pa., on a spun-bonded polyester substrate. Other suitable materials for forming the filtering membrane include, for example, Gore-Tex® and P84 polyimide fibers from Imi-Tech Fibers GmbH, Lenzing, Austria. Filter medium 175 is preferably pleated to increase the surface area, as shown in FIG. 6. End caps 172, 174 can be made from a variety of inert, structural materials, such as stainless steel.

End cap 172 is designed for attachment to cylindrical portions 148. For example, end cap 172 can be threaded for attachment to mated threads on lip 150 of cylindrical portions 148. Alternatively, end cap 172 can fit together with lip 150 such that a hose clamp or the like can hold filter in a tight seal with cylindrical portion 148. In the embodiment shown in FIGS. 1 and 6, lower end cap 174 includes a flange which engages a threaded stud 176 for attachment of filters 104 to cylindrical portions 148. A nut is used to hold filter 104 on stud 176. Stud 176 is secured to support 178 within cylindrical portion 148. Support 178 has an open structure to permit essentially free flow of fluid. The connection between upper end cap 172 and lip 150 can include an O-ring or gasket to inhibit gas flow through the connection bypassing the filter material.

The embodiment of the particle collection apparatus 100 in FIGS. 3, 4 has seven filters 104. This number of filters efficiently makes use of the space within tank 120. Generally, a larger number of filters provides for less perturbation on the operation of the particle collection apparatus when back pressure is applied to a particular filter to dislodge the accumulated particles. On the other hand, a smaller number of filters provides for easier maintenance of the apparatus. Furthermore, the size of the filters is related to the quantity of particles that can be collected on a filter before back pressure must be applied to dislodge the particles for collection. The size of the filters along with the number of filters determines the air flow from collection section 142 to filtered plenum 144. In summary, the number and size of filters 104 can be set to a desired value to balance performance characteristics and convenience.

For example, to collect nanoscale particles produced by one or two laser pyrolysis apparatuses each with a production rate on the order of about 1 kg/hr, seven filters can be used. Reasonably sized filters have a length of about 20 inches and a diameter of about 6 inches. A filter with about 34 pleats of about 1 inch deep has a total surface area of about 10 square feet. Thus, with seven filters a total of about 70 square feet of filter medium surface area is used.

Referring to FIG. 5, exhaust opening 154 generally is connected by way of an additional conduit 196 to a pump 198. For preferred embodiments involving the collection of particles from a laser pyrolysis apparatus, suitable pumps include, for example, Leybold Model SV300 pump from Leybold Vacuum Products, Export, PA with a pumping capacity of about 195 cfm. A variety of other types and brands of pumps can be used. Conduit 196 from exhaust opening 154 to pump 198 generally includes one or more valves to control the gas flow. It may be desirable to flow the exhaust of pump 198 through an abatement device to remove any remaining reactive chemicals before venting into the atmosphere. Apparatus 100 can be placed in a fume hood for ventilation, environmental, health and safety considerations.

Referring to FIGS. 1, 4 and 5, back pressure system 110 includes pulse valves 202, accumulator 204, tubes 206 and controller 208. Pulse valves 202 preferably provide very rapid opening and closing to provide a short pulse of gas. Preferably, pulse valve 202 provides a pulse of gas less than about 1 sec. and more preferably from about 10 millisec. to about 500 millisec. These very short pulses provide very fast transient gas bursts that have sharp wave fronts at the front and rear of the pulse. Suitable valves 202 include diaphragm valves such as diaphragm valves available from Goyen Valve Corp., Lakewood, N.J. Accumulator 204 provide a reproducible high pressure volume of gas to valves 202.

Valves 202 preferably are connected to an accumulator 204, i.e., a storage vessel for immediate gas delivery. Only a single accumulator 204 is needed, although a plurality of accumulators can be used, if desired. Accumulator 204 is connected to an inert gas source by way of supply tube 210. Suitable inert gases can be selected based on the material being collected and the gases flowing through the system. In general, Ar, He and $N_2$ are suitable inert gases for most situations.

Accumulator 204 provides for a sharper pulse of gas without the need for a very large supply tube from an inert gas source. At high pressure, the accumulator preferably contains a greater mass of gas than would occupy the volume of filter 104 plus the volume of cylindrical portion 148 at a lower pressure. For the specific filters described herein for use with one or two laser pyrolysis apparatuses, the accumulator has a volume on the order of 600 cubic inches at a pressure ranging from about 50 to about 100 psi. Tubes 206 direct the pulse of gas from valves 202 to filters 104. Tubes 206 preferably terminate only a short distance within cylindrical portions 148 so that a directed gas pulse reaches end cap 174 and fills the volume of filter 104.

In the embodiment shown in FIGS. 1, 3 and 4, a pulse valve 202 and a tube 206 are associated with each filter 104. Alternatively, a single pulse valve 202 can be used. In this alternative embodiment, the single pulse valve 202 is connected to a manifold leading to a set of tubes that each direct gas toward a single filter. Additional valves can be used to direct the gas flow to only a portion of the manifold or a single tube, if desired.

Controller 208 controls the operation of back pressure system 110. In particular, controller 208 provides signals to pulse valves 202 that instruct valves 202 to pulse. Controller 208 can be a microprocessor that is involved in the operation of other components of the system. Alternatively, controller 208 can be a programmable, sequential timer such as those sold by Goyen Valve Co., Lakewood, N.J. for the control of pulse valves on reverse jet dust collectors. For example, the Goyen TB Timer can provide programmable outputs for 1 to 10 pumps. Preferred pulsing sequences involve, to the extent possible, sequential pressure pulses of filters that are physically spaced apart, to reduce the disruption of the air flow within the collection chamber. With respect to the configuration of filters in FIG. 7, a preferred pulsing sequence would not involve sequential pulsing of adjacent filters except when the center filter is pulsed.

As filters 104 become loaded with collected particles, the pressure differential determined by the difference between the pressure measured by pressure gauge 156 (collection section 142) and pressure gauge 158 (filtered plenum 144) increases due to decreased pumping efficiency. Thus, the pressure differential can be used to evaluate whether the back pressure pulse rate is adequate. If the filters are being pulsed at sufficient frequency, the pressure differential should be small or zero. If a pulse is insufficient to remove a maximum amount of particles from the filter, the pressure of the pulses can be increased as an alternative to increasing the pulse rate. If the pressure differential is larger than desired, the rate of pulsing the filters can be increased. Using the pressure differential, empirical adjustment of the pulsing frequency can be accomplished in a particularly convenient fashion, although empirical adjustment of the pulsing frequency also can be based on other observations of the operation of the collection system.

Particle drain valve 112 preferably is an iris diaphragm valve. Particle drain valve 112 can be designed for manual operation or automatic operation. Suitable drain valves include, for example, a Mucon™ iris-diaphragm valve from Kemutec, Inc., Bristol, Pa. Other types of valves such as pinch valves and gate valves can be used for particle drain valve 112.

System positioning system 114 is used to support chamber 102 and can be used to position chamber 102 for maintenance and for connection and/or disconnection from a particle source. In the embodiment depicted in FIGS. 1 and 2, system positioning system 114 includes vertical supports 340, 342 connected to the upper portion of tank 120 at brackets 344, 346 and horizontal support 348 connected to the lower portion of tank 120 with cables 350. Vertical supports 340, 342 provide rigid support for the top portion of chamber 102. Rather than supporting the lower portion with cables 350, the lower portion can be supported with a manual or powered jack or hydraulic lift.

Horizontal support 348 can be raised or lowered to change the position of the lower portion of chamber 102. In particular, if connector 132 is disengaged, the lower portion of tank 120 can be lowered relative to the top portion of tank 120 while the top portion remains supported by vertical supports 340, 342. Generally, the particle source is disconnected at inlet opening 152 prior to lowering the bottom portion of tank 120. If tank 120 includes doors for access to the interior of tank 120, the positioning system can be modified accordingly.

During operation of particle collection apparatus 100, particle drain valve 112 is either closed or connected with the storage/conveyor system. For some embodiments, pump 198 maintains a reduced pressure within tank 120 and in a particle synthesis apparatus. The reduced pressure preferably is less than about 700 Torr and more preferably less than about 600 Torr. For a particle synthesis apparatus involving laser pyrolysis, as described below, the pressure preferably ranges from about 80 Torr to about 600 Torr and more preferably between about 80 Torr and about 500 Torr. The flow created by pump 198 draws the particles from inlet opening 152 and produces a gas flow from collection section 142 to filtered plenum 144 through filters 104.

Filters 104 are pulsed periodically to remove collected particles and maintain gas flow through filters 104. Particles displaced from filters 104 fall due to gravity since they are no longer particularly buoyant once they accumulate on filters 104. Funnel section 122 directs the displaced particles to particle drain valve 112, where the particles exit tank 120 if particle drain valve 112 is open. Particle drain valve 112 can be left open while the collection system is in operation. The storage/conveyor system can be secured near particle drain valve 112 such that ambient air cannot enter tank 120 by way of particle drain valve 112. The storage/conveyor system operates under a similar reduced pressure when particle drain valve 112 is open.

B. Storage/Conveyor System

The storage/conveyor system can include a storage container, assorted components for the support and transportation of a storage container and/or a conveyor apparatus. An embodiment of the storage/conveyor system depicted in FIGS. 1, 2 and 5 features a storage container 300. Storage container 300 can be attached to a sleeve 302 extending from particle drain valve 112 using a hose clamp 304 or other suitable fastener.

Figure 7:
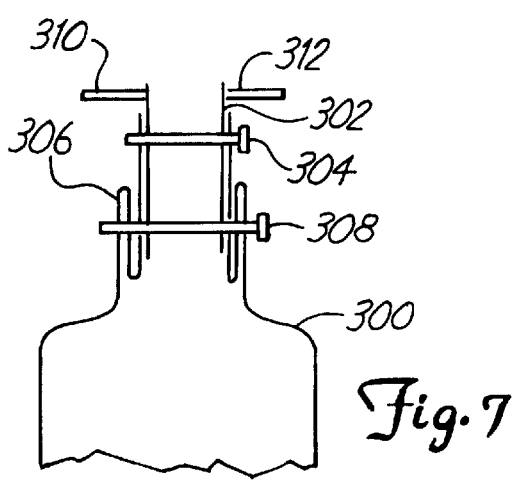
FIG. 7 is a schematic side view of a polymer bag attached to the particle drain of the collection apparatus of FIG. 1 where clamp 308 has been loosened to show an embodiment where the neck of the bag has an elongated section that is folded for attachment.

In a preferred embodiment shown in FIG. 7, storage container 300 included a flexible neck 306, which can be folded for attachment to sleeve 302 with a second hose clamp 308 or the like. To detach storage container 300, second hose clamp 308 can be loosened such that flexible neck 306 can be extended to expose a clean section of polymer. If desired, flexible neck 306 can be sealed using a heat sealer. Flexible neck 306 preferably is made from a thermoplastic polymer such as polyethylene. Flexible neck 306 can be covered with a reusable shell that is lined with the thermoplastic polymer.

Sleeve 302 can include tube 310 and tube 312 to assist with the placement and removal of storage container 300. Tube 310 is connected to an inert gas source such that the pressure in storage container 300 can be increased to about 1 atmosphere with inert gas when particle drain valve 112 is closed. Tube 312 is connected to a vacuum such that storage container 300 can be evacuated to approximately the pressure within tank 120 prior to opening drain valve 112 after a different storage container 300 has been put in place. In alternative embodiments, a single tube replaces tube 310 and tube 312 where the single tube is connected to a three way valve or manifold to provide for the selective connection to an inert gas source or vacuum.

In the embodiment of FIGS. 1, 2 and 5, storage container 300 is supported by an exoskeletal container 320. If storage container 300 is a plastic bag, exoskeletal container 320 is evacuated to a pressure comparable to or less than the pressure within the storage container. When exoskeletal container 320 is evacuated, the plastic bag can expand to fill with particles. The pressure within exoskeletal container 320 can be adjusted appropriately for the switching of storage containers 300.

Storage container 300 is located below the particle collection apparatus 100. As a result of the relative positioning of particle collection apparatus 100 and the particle synthesis apparatus, it may be desirable for the storage container to be located above or below the level of the particle synthesis apparatus. This can be accomplished by selecting a suitable level of the particle synthesis apparatus relative to a surface supporting storage container 300. As depicted in FIGS. 1, 2 and 5, storage container 300 and exoskeletal container 320 are placed below a surface supporting the particle synthesis apparatus, e.g., a laser pyrolysis apparatus. In this particular embodiment, storage container 300 and exoskeletal container 320 are placed in a pit 322. Within pit 322, exoskeletal container 320 can be placed on an electric scissor lift cart 324 to facilitate raising container 320 to surface 326. In one embodiment, cart 324 has wheels 332 that run on a flat rail 334 and a V-guide rail 336. Pit cover 338 can be used alternately to cover and uncover a section of pit 322 unobstructed by tank 120 such that cart 324 can be raised using scissor lift 340. In the embodiment shown in FIG. 1, pit cover 338 pivots along a path shown.

When storage container 300 is sufficiently full, particle drain valve 112 can be closed. When particle drain valve 112 is closed, storage container 300 can be brought to about atmospheric pressure using inert gas from tube 310, if desired. Then, storage container 300 can be disconnected and removed. If storage container 300 is a polymer bag, the polymer bag can be sealed, as described above. Once a sufficiently full storage container 300 is removed, another storage container can be secured near particle drain valve 112. Once the other storage container 300 is in place, particle drain valve 112 can be reopened. The replacement storage container can be evacuated prior to reopening particle drain valve 112.

While particle drain valve 112 is closed, particles accumulate in funnel section 122. The operation of replacing storage container 300 with another container preferably does not take such a long period of time that funnel section 122 becomes full of particles. Once particle drain valve 112 is reopened, particles that have accumulated in funnel section 122 fall into storage container 300. Sonic or vibratory shaker 118 can be used to facilitate the movement of the particles from funnel section 122 to particle drain valve 112 following the reopening of particle drain valve 112 and/or at other times in the operation of the collection apparatus 100. Following this procedure, collection apparatus 100 can be operated continuously for the collection of particles filling many storage containers 300.

Eventually, filters 104 can deteriorate such that trapping efficiency is unacceptable and/or such that it becomes difficult to maintain the desired pressure within tank 120. When this occurs, collection system 100 is shut down, and filters 104 are replaced. Collection system 100 also can be shut down for other maintenance operations.

Figure 8:
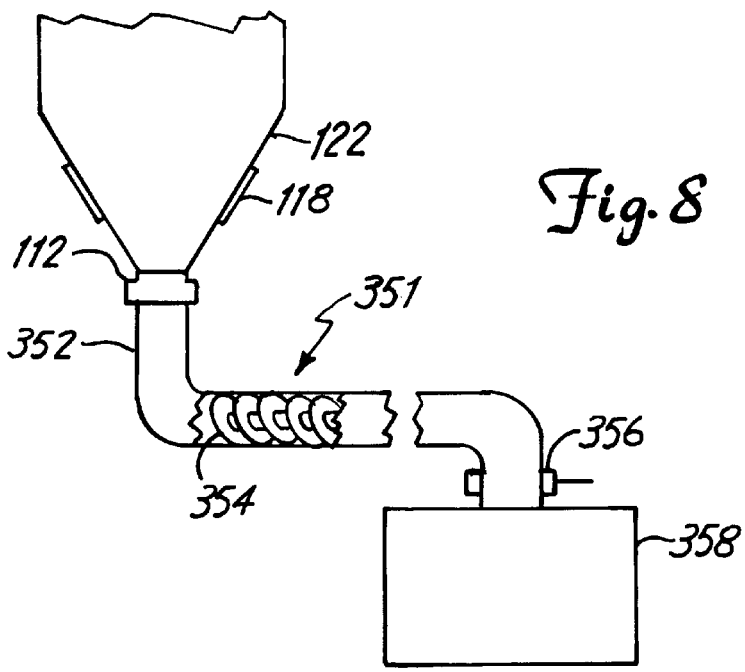
FIG. 8 is a schematic side view of an alternative embodiment with the particle drain of the collection apparatus feeding into a conveyor apparatus. A portion of the structure has been removed to reveal a portion of the conveyor.

In an alternative embodiment depicted in FIG. 8, the storage/conveyor system 351 includes a feed tube 352, a conveyor 354, an optional terminus valve 356 and terminal site 358. Feed tube 352 is connected to the particle collection apparatus such that collected particles enter feed tube 352.

Particles from feed tube 352 reach conveyor 354. Conveyor 354 can have a variety of designs that do not alter the pressure within storage/conveyor system 350 significantly. For example, conveyor 354 can be a conveyor belt, a peristaltic pump or a screw conveyor, as shown in FIG. 8. Conveyor 354 moves the collected particles toward terminal site 358 without significantly altering the pressure within the collection apparatus.

Terminus valve 356 can be used together with particle drain valve 112 or as a replacement for particle drain valve 112, as desired. Terminal site 358 can be a storage container or an apparatus for additional processing of the particles.

In operation, the particles are directed to conveyor 354, which moves the particles some distance from the collection apparatus 100. At some point the particles are brought to atmospheric pressure if the collection apparatus is operating under reduced pressure. Thus, either particle drain valve 112 or terminus valve 356 can operate as an air lock such that the down stream portions of the system can be increased in pressure. Alternatively, the air lock for raising the pressure can be located in the particle flow stream beyond terminal site 358, if terminal site 358 is a further processing apparatus and this further processing apparatus operates at a pressure nearly equal to the pressure within collection apparatus 100.

C. Particle Synthesis Apparatus

Inlet opening 152 of tank 120, as shown in FIGS. 1 and 2 receives the input fluid stream including the particles for collection. The collection apparatus can be used to collect particles in a fluid stream from a particle synthesis apparatus. Various particle synthesis apparatuses are suitable for operation with the collection system. For example, the particle synthesis apparatus can be a flame production apparatus such as the apparatus described in U.S. Pat. No. 5,447,708 to Helble et al., entitled "Apparatus for Producing Nanoscale Ceramic Particles," incorporated herein by reference. Alternatively, the particle production apparatus can be a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

Preferred particle production systems are based on laser pyrolysis. A high production rate laser pyrolysis apparatus is described in copending and commonly assigned patent application Ser. No. 08/808,850, entitled "Efficient Production of Particles by Chemical Reaction," filed on Feb. 28, 1997, now U.S. Pat. No. 5,958,348, incorporated herein by reference. Laser pyrolysis apparatuses are particularly suitable for the production of particles having an average diameter less than about 1000 nm.

Figure 9:
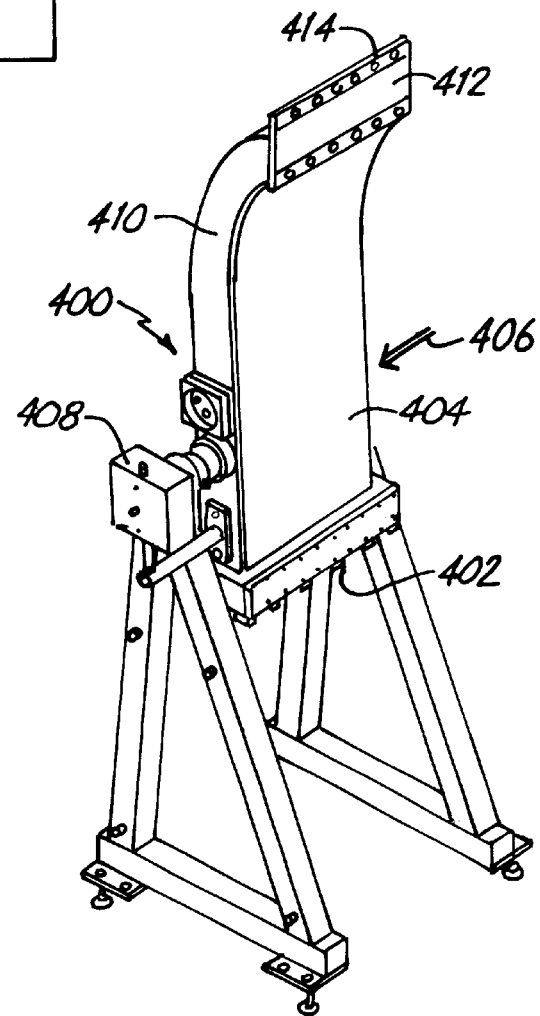
FIG. 9 is a perspective view of a laser pyrolysis apparatus that can be used with the particle collection apparatus as shown in FIG. 1.

One preferred embodiment of a laser pyrolysis apparatus 400 is shown in FIG. 9. Reactant inlet 402 is located at the bottom of reaction chamber 404. Reaction chamber 404 is elongated in one dimension. A laser beam path 406 enters the reaction chamber through a window and traverses the elongated direction of the reaction chamber terminating at beam dump 408. In operation, the laser beam intersects a reactant stream generated by the reactant inlet. The top of the reaction chamber 404 opens into outlet duct 410. Outlet duct 410 carries the product particles out of the plane of the reactant stream to outlet port 412. Outlet port 412 includes flange 414 or the like for connection to inlet opening 152 of particle collection apparatus 100. FIGS. 1 and 2 shows a laser pyrolysis apparatus 400 connected to the particle collection apparatus 100. The position of laser 420 is indicated schematically in FIG. 2, laser 420 preferably being an infrared laser.

As shown in FIG. 1, particle collection apparatus 100 is configured for optional attachment to a second laser pyrolysis apparatus, shown in phantom lines opposite a first laser pyrolysis apparatus 400. Particle collection apparatus 100 can be configured to attach to greater than two particle synthesis apparatuses, if desired.

The embodiments described above are intended to be exemplary and not limiting. Additional embodiments are within the claims below. Although the present invention has been described with reference to preferred embodiments, workers skilled in the art will recognize that changes can be made in form and detail without departing from the spirit and scope of the invention.

What is claimed is:

1. A particle production system comprising:

a particle synthesis apparatus comprising:

a reaction chamber isolated from the ambient atmosphere, the reaction chamber comprising gas and the reaction chamber having a reactant inlet for supplying reactant into the reaction chamber and a product outlet from which the product particles exit the reaction chamber, wherein the gas in the reaction chamber is at a pressure less than about 700 Torr; and a particle collection apparatus comprising:

a collection chamber having a collector inlet, a gas outlet, and a particle drain, wherein the gas outlet is connected to a pump that vents to the atmosphere;

a plurality of filters within the collection chamber such that the filters obstructs flow paths from the collector inlet to the gas outlet and such that particles dislodged from the filters flow to the particle drain; and a particle removal system that applies forces to the filters to dislodge particles from the filters;

wherein the product outlet of the particle synthesis apparatus is in fluid communication with the collector inlet of the particle collection apparatus.

2. The particle production system of claim 1 wherein the particle synthesis apparatus further comprises an infrared laser.

3. The particle production system of claim 2 wherein the reactant inlet produces a reactant stream that intersects with a beam from the laser.

4. The particle production system of claim 1 wherein the gas within the collection chamber is at a pressure between about 80 Torr and about 500 Torr.

5. The particle production system of claim 1 wherein the particle collection apparatus comprises a back pressure system that applies a quantity of gas to at least one said filters against the flow from the collector inlet to the gas outlet.

6. The particle production system of claim 1 wherein the particle removal system comprises a controller that operates a valve to generate a gas pulse against a subset of the plurality of filters.

7. The particle production system of claim 5 wherein the back pressure system comprises a pulse valve.

8. The particle production system of claim 7 wherein the pulse valve comprises a diaphragm valve.

9. The particle production system of claim 7 wherein the pulse valve has a response time to open the valve for a period of time between about 10 millisec. to about 500 millisec.

10. The particle production system of claim 1 where the particle synthesis apparatus further comprises particles within said reaction chamber having an average diameter less than about 1000 nm.

11. The particle production system of claim 1 wherein the particle removal system comprises a mechanical shaking system that applies force to the filter.

12. A particle collection apparatus for the collection of particles, the apparatus comprising:

a chamber having an inlet, a gas outlet, gas within the chamber and a particle drain, wherein the gas within the chamber is at a pressure less than about 700 Torr and wherein the gas outlet is connected to a pump that vents to the atmosphere;

a first filter within the chamber such that the first filter obstructs flow paths from the inlet to the gas outlet and such that particles dislodged from the first filter flow to the particle drain;

a particle removal system that applies forces to the first filter to dislodge particles from the first filter;

a drain valve at the bottom of the chamber;

a storage container that releasably secures to the drain valve to form a seal; and particles within the storage container, the collection of particles having an average primary particle size less than about 1000 nm.

13. The particle collection apparatus of claim 12 wherein the gas within the chamber is at a pressure less than about 500 Torr.

14. The particle collection apparatus of claim 12 further comprising a plurality of additional filters within the chamber such that in addition to the first filter, the additional filters obstruct additional flow paths from the inlet to the gas outlet and such that particles dislodged from the additional filters also flow to the particle drain.

15. The particle collection apparatus of claim 12 wherein the particle removal system comprises a back pressure system to apply a gas pulse to the filter against the flow from the collector inlet to the gas outlet.

16. The particle collection apparatus of claim 12 wherein the storage container has a flexible neck that is capable of being folded.

17. The particle collection apparatus of claim 12 further comprising a sleeve between the drain valve and the storage container, the sleeve being connected to an inert gas source and a vacuum source for the adjustment of pressure within the storage container.

\* \* \* \* \*